United States Patent
Hoctor et al.

(10) Patent No.: US 11,330,314 B2
(45) Date of Patent: May 10, 2022

(54) METHODS AND SYSTEMS FOR PREVENTING A USER FROM TERMINATING A SERVICE BASED ON THE ACCESSIBILITY OF A PREFERRED MEDIA ASSET

(71) Applicant: Rovi Guides, Inc., San Jose, CA (US)

(72) Inventors: John Hoctor, Newton, MA (US); Matthew Emans, Boston, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/398,533

(22) Filed: Apr. 30, 2019

(65) Prior Publication Data

US 2020/0068239 A1 Feb. 27, 2020

Related U.S. Application Data

(63) Continuation of application No. 14/501,520, filed on Sep. 30, 2014, now Pat. No. 10,327,019.

(Continued)

(51) Int. Cl.
*H04N 21/25* (2011.01)
*H04N 21/2543* (2011.01)
(Continued)

(52) U.S. Cl.
CPC .......... *H04N 21/251* (2013.01); *G06Q 30/02* (2013.01); *G06Q 30/0631* (2013.01); *H04N 21/2543* (2013.01); *H04N 21/25435* (2013.01); *H04N 21/25891* (2013.01); *H04N 21/2668* (2013.01); *H04N 21/40* (2013.01); *H04N 21/42201* (2013.01); *H04N 21/44213* (2013.01); *H04N 21/44218* (2013.01); *H04N 21/44222* (2013.01);

(Continued)

(58) Field of Classification Search
CPC ............. H04N 21/251; H04N 21/2543; H04N 21/25435; H04N 21/25891; H04N 21/2668; H04N 21/40; H04N 21/42201; H04N 21/44213; H04N 21/44218; H04N 21/44222; H04N 21/462; H04N 21/4667; H04N 21/482; H04N 21/4821; H04N 21/812; H04N 21/8133; G06Q 30/02; G06Q 30/0631

See application file for complete search history.

(56) References Cited

U.S. PATENT DOCUMENTS 5,873,069 A * 2/1999 Reuhl .................. G06Q 20/201
                                                                    235/375
5,907,800 A * 5/1999 Johnson ................ H04M 15/00
                                                                    379/114.1

(Continued)

*Primary Examiner* — Chenea Davis
(74) *Attorney, Agent, or Firm* — Haley Guiliano LLP

(57) ABSTRACT

Methods and systems are described herein for preventing a user from terminating a service. Specifically, the media guidance application may generate for display content aimed at preventing the user from terminating a service in response to determining that a user is likely to terminate the service. For example, in response to determining that a particular media asset preferred by a user is accessible through another service, the media guidance application generates the content associated with preventing the user from terminating his or her current service (e.g., discounts to the cost of the current service, promotion or lists of media content available through the current service, etc.).

20 Claims, 6 Drawing Sheets

Related U.S. Application Data

(60) Provisional application No. 61/985,149, filed on Apr. 28, 2014.

(51) Int. Cl.
*H04N 21/482* (2011.01)
*G06Q 30/06* (2012.01)
*H04N 21/258* (2011.01)
*H04N 21/442* (2011.01)
*H04N 21/81* (2011.01)
*H04N 21/2668* (2011.01)
*H04N 21/422* (2011.01)
*H04N 21/462* (2011.01)
*H04N 21/466* (2011.01)
*G06Q 30/02* (2012.01)
*H04N 21/40* (2011.01)

(52) U.S. Cl.
CPC ....... *H04N 21/462* (2013.01); *H04N 21/4667* (2013.01); *H04N 21/482* (2013.01); *H04N 21/4821* (2013.01); *H04N 21/812* (2013.01); *H04N 21/8133* (2013.01)

(56) References Cited

U.S. PATENT DOCUMENTS

| | | | | |
|---|---|---|---|---|
| 2003/0188316 A1* | 10/2003 | DePrez | ............ | G06Q 20/40 |
| | | | | 725/87 |
| 2004/0210936 A1* | 10/2004 | Rao | ............ | H04N 7/162 |
| | | | | 725/87 |
| 2009/0133048 A1* | 5/2009 | Gibbs | ............ | G06F 16/48 |
| | | | | 725/14 |
| 2013/0066464 A1* | 3/2013 | Maskatia | ............ | G06Q 30/06 |
| | | | | 700/234 |
| 2014/0143018 A1* | 5/2014 | Nies | ............ | G06Q 30/016 |
| | | | | 705/7.32 |

* cited by examiner

METHODS AND SYSTEMS FOR PREVENTING A USER FROM TERMINATING A SERVICE BASED ON THE ACCESSIBILITY OF A PREFERRED MEDIA ASSET

CROSS-REFERENCE TO RELATED APPLICATION

This application is a continuation of U.S. patent application Ser. No. 14/501,520, filed Sep. 30, 2014, (currently allowed), which claims the benefit of U.S. provisional patent application No. 61/985,149, filed Apr. 28, 2014, which is are hereby incorporated by reference in their entireties.

BACKGROUND

In conventional systems, users have a plethora of content and a plethora of services offering to provide that content at their disposal. To enjoy the content, users may access one or more services, which typically feature a separate price for each item or a fixed-priced, short-term subscription for unlimited access to the entire content portfolio of the service. However, due to the competition between content providers, users may easily and frequently stop using one service in favor of another. Therefore, encouraging users to stay with a current service is a high priority to the current service providers.

SUMMARY

Accordingly, methods and systems are described herein for preventing a user from terminating a service. Specifically, the media guidance application may generate for display content aimed at preventing the user from terminating a service in response to determining that a user is likely to terminate the service. For example, in response to determining that a particular media asset preferred by a user is accessible through another service, the media guidance application generates the content associated with preventing the user from terminating his or her current service (e.g., discounts to the cost of the current service, promotion or lists of media content available through the current service, etc.).

For example, the media guidance application may compare the media content accessible from a first service (e.g., currently subscribed to by the user) to a second service. If the media content is accessible by both services, the media guidance application determines that there is a likelihood that the user may terminate the first service (e.g., in favor of the second service). Moreover, in order to reduce false positives (e.g., determining a user is likely to terminate the first service when in fact the user is not likely to terminate the service), the media guidance application may limit the media that is compare to only media assets that are preferred by the user.

In some aspects, the media guidance application may determine a user is subscribed to a first service. For example, the media guidance application may store (e.g., in a user profile) a list of services subscribed to by the user. In another example, the media guidance application may determine services subscribed to by the user based on data related to the services (e.g., billing statements received by the user, authorization data transmitted by the service, user inputs identifying subscribed to services, etc.). The media guidance application may then determine media assets accessible through the first service. For example, in response to determining the user subscribes to the first service, the media guidance application may retrieve a list of media assets accessible from that media asset.

The media guidance application may retrieve a viewing history for the user from a user profile and identify a preferred media asset of the media assets accessible from the first service based on the viewing history. For example, the media guidance application may determine media assets (or a particular series of media assets) that are viewed with a greater frequency by the user relative to other media assets.

For example, the media guidance application may determine a media asset is part of a series of media assets of which the user has been consuming. The media guidance application may also receive an indication from the viewing history of a rate at which the user has consumed the series of media assets over a time period. The media guidance application may then identify a preferred media asset of the media assets by comparing the rate at which the user has consumed the series of media assets to a threshold rate (e.g., indicate an average rate at which the user consumes media assets). The media guidance application may then determine the preferred media asset in response to determining the rate exceeds the threshold rate. For example, in response to determining that a user is binge watching a particular television series, the media guidance application may determine that the television series (or an episode of the television series) is a preferred media asset.

The media guidance application may then determine whether the preferred media asset is accessible through a second service. For example, the media guidance application may cross-reference a database listing services that provide the preferred media asset to determine whether the second service provides the preferred media asset.

In response to determining the preferred media asset is accessible through the second service, the media guidance application may generate for display, on a display device, content associated with preventing the user from terminating the service. For example, the media guidance application may generate for display content that offer a discount to the cost of the first service. In another example, the media guidance application may generate for display content that lists media assets that are accessible (either currently or in the future) through the first service that may not be accessible through the second service. In yet another example, the media guidance application may determine whether the preferred media asset is accessible through a second service in response to determining that a subscription period for the first service is ending, and generate content featuring offers to renew the subscription of the user.

In some embodiments, the media guidance application may compare additional information about the first and second service in order to determine whether or not to generate for display the content associated with preventing the user from terminating the service. For example, the media guidance application may compare the price or release date of a preferred media asset, and only generate the content in response to determining the price or release date of the media asset from the second service is superior to that of the first service.

For example, the media guidance application may compare a first price for accessing the preferred media asset through the first service to a second price for accessing the preferred media asset through the second service. The media guidance application may then determine not to generate for display, on the display device, the content associated with preventing the user from terminating the first service in response to determining that the first price is less than the second price. For example, the media guidance application may determine that the lower price is itself an incentive to remain with the first service.

In another example, the media guidance application may compare a first date when the preferred media asset is accessible through the first service to a second date when the preferred media asset is accessible through the second service. The media guidance application may then determine not to generate for display, on the display device, the content associated with preventing the user from terminating the first service in response to determining that the first date is before the second date. For example, the media guidance application may determine that the earlier release date is itself an incentive to remain with the first service.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
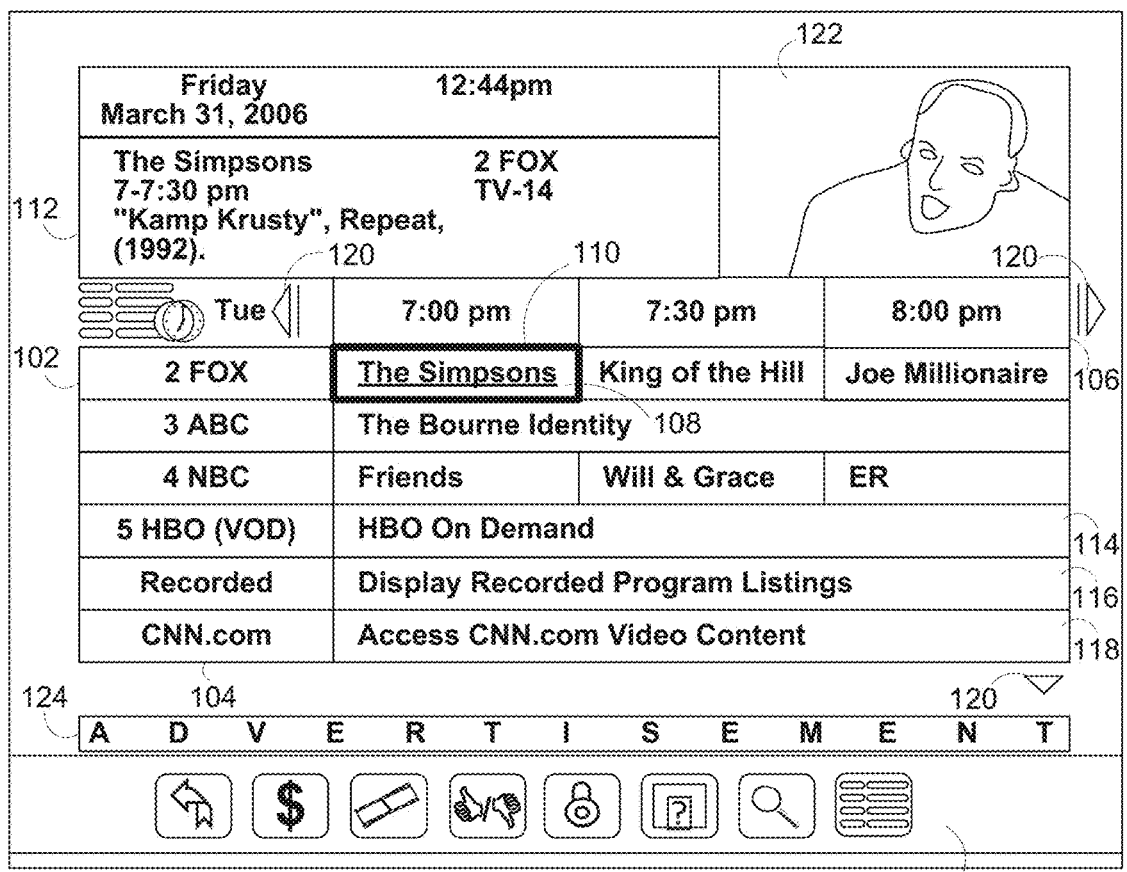
FIG. 1 shows an illustrative example of a display screen generated by a media guidance application that lists a plurality of media listing in accordance with some embodiments of the disclosure.

Methods and systems are described herein for preventing users from terminating services. Specifically, the media guidance application may generate for display content aimed at preventing the user from terminating a service in response to determining that a user is likely to terminate the service. For example, in response to determining that a particular media asset preferred by a user is accessible through another service, the media guidance application generates the content associated with preventing the user from terminating his or her current service (e.g., discounts to the cost of the current service, promotion or lists of media content available through the current service, etc.).

As referred to herein, a "media guidance application," "interactive media guidance application," or "guidance application" is an application that provides, through an interface, media guidance to a user. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

For example, the media guidance application may compare the media content accessible from a first service (e.g., currently subscribed to by the user) to a second service. If the media content is accessible by both services, the media guidance application determines that there is a likelihood that the user may terminate the first service (e.g., in favor of the second service). Moreover, in order to reduce false positives (e.g., determining a user is likely to terminate the first service when in fact the user is not likely to terminate the service), the media guidance application may limit the media that is compare to only media assets that are preferred by the user.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application may determine one or more media assets that are accessible to a user through a service. As referred to herein a "service" is a source, direct or indirect, of media content. For example, a service may be any entity that provides media assets and/or provides access to media assets. For example, a service may include any entity that creates, sells, distributes, and/or facilitates the creation, selling and/or distribution of media assets. For example, a service may include an entity that streams media content to user or may include an entity that provides Internet services through which the user can stream media content. In another example, an entity may include a content provider (e.g., a broadcast television station) that broadcasts television programs to a user or may include a broker through which the user may rent or buy copies of the television programs.

As referred to herein, "terminating access to service," "terminating use of service," or "terminating a service" means that the service was disconnected by the user, requested by the user to be removed from the user's subscription plan, or is other wise no longer accessible (or media content offered by the service is no longer accessible) to the user. For example, after terminating access to a given service a user has to re-subscribe (repay) to the service to resume access to media content from the service.

As referred to herein, a media asset is "accessible" from a service based on whether or not a user may obtain a media asset for consumption on a permanent or temporary basis at one or more points in the future as a result, directly or indirectly, of subscribing to, paying for, or otherwise using the service. In some embodiments, the media guidance application may use additional criteria to determine whether or not a media asset is accessible from a service.

In some embodiments, the media guidance application may determine in which formats a media asset is accessible and what services provider that various formats. The media guidance application may use this information to determine whether or not a media asset is accessible from a service. For example, the media guidance application may determine that a movie is accessible from one service (e.g., a service that provides media content streamed over the Internet) via downloading the movie over the Internet. The media guidance application may also determine that the same movie is accessible through another service (e.g., a commercial establishment that sells DVD's) by purchasing a DVD of the movie.

For example, in some embodiments, the media guidance application may distinguish between the different formats. For example, to determine whether or not a media asset (accessible by streaming the media asset over the Internet from one service) is accessible from other services, the media guidance application may only determine if the other services allow a user to stream the particular media asset. Alternatively, in some embodiments, the media guidance application may not distinguish between different formats. For example, to determine whether or not a media asset (accessible by streaming the media asset over the Internet from one service) is accessible from other services, the media guidance application may determine if the other services allow a user to stream the particular media asset, buy a DVD of the media asset, view the media asset over broadcast television, access a transcript of the media asset, etc.

In another example, to determine whether or not a media asset (accessible in high definition from one service) is accessible from other services, the media guidance application may only determine if the other services allow a user to access the media asset in high-definition. Alternatively, in some embodiments, the media guidance application may not distinguish between resolution, file type, file size, etc. For example, to determine whether or not a media asset (accessible from one service in high-definition) is accessible from other services, the media guidance application may determine if the other services allow a user to access the media asset in high-definition or standard definition.

For example, the media guidance application may compare a first format of a media asset that is accessible through a first service to a second format of the media asset that is accessible through a second service. The media guidance application may then determine whether or not to generate for display content associated with preventing the user from terminating the first service in response to determining the relationship (e.g., same, different, etc.) of the first format to the second format.

In some embodiments, the media guidance application may determine when a media asset is accessible and may determine particular times and/or dates that the media asset is accessible from the different services. The media guidance application may use this information to determine whether or not a media asset is accessible from a service. For example, the media guidance application may determine that a movie is accessible from one service (e.g., a service that provider media content streamed over the Internet) at a particular point in the future (e.g., during the month of July). The media guidance application may also determine that the same movie is accessible from another service (e.g., a commercial establishment that sells DVD's) at any time in the future.

For example, in some embodiments, the media guidance application may consider times or dates of accessibility when determining whether or not a media asset is accessible from a particular service. For example, to determine whether or not a media asset (accessible during July from one service) is accessible from other services, the media guidance application may only determine if the other services allow a user to access the media asset during July. Alternatively, in some embodiments, the media guidance application may not consider times or dates of accessibility when determining whether or not a media asset is accessible from a particular service. For example, to determine whether or not a media asset (accessible during July from one service from one service) is accessible from other services, the media guidance application may determine if the other services allow a user to access the media asset at the same time, at different times, etc.

For example, the media guidance application may compare a first period of time when a media asset is accessible through a first service to a second period of time when the media asset is accessible through a second service. The media guidance application may then determine whether or not to generate for display content associated with preventing the user from terminating the first service in response to determining the relationship (e.g., before, after, equal, longer than, shorter than, etc.) of the first period of time to the second period of time.

In some embodiments, the media guidance application may determine at what price a media asset is accessible and may determine the particular prices that the media asset is accessible from the different services. The media guidance application may use this information to determine whether or not a media asset is accessible from a service. For example, the media guidance application may determine that an eBook is accessible from one service at a cost of ten dollars. The media guidance application may also determine that the same eBook is accessible from another service at a cost of twelve dollars.

For example, in some embodiments, the media guidance application may consider the price of accessibility when determining whether or not a media asset is accessible from a particular service. For example, to determine whether or not a media asset (accessible for a cost of ten dollars from one service) is accessible from other services, the media guidance application may only determine if the other services grant access for ten dollars. Alternatively, in some embodiments, the media guidance application may not consider the price of accessibility when determining whether or not a media asset is accessible from a particular service. For example, to determine whether or not a media asset (accessible for a price of ten dollars from one service) is accessible from other services, the media guidance application may determine if the other services grant access to the media asset for more, less, or the same cost.

For example, the media guidance application may compare a price for a first service (or the price of access to a media asset through the first service) to a price for the second service (or the price of access to the media asset through the second service). The media guidance application may then determine whether or not to generate for display content associated with preventing the user from termination the first service in response to determining the relationship (e.g., more, less, equal) of the price of the first service to the price of the second service.

In some embodiments, the media guidance application may determine a type of pricing structure from which a media asset is accessible and may determine the pricing structure from which that the media asset is accessible from the different services. The media guidance application may use this information to determine whether or not a media asset is accessible from a service. For example, the media guidance application may determine that a television program is accessible from one service on a per item basis. The media guidance application may also determine that the same television program (as well as other television programs) is accessible from another service for a flat monthly fee.

For example, in some embodiments, the media guidance application may consider the pricing structure of the service when determining whether or not a media asset is accessible from a particular service. For example, to determine whether or not a media asset (accessible for a one-time, payment upon delivery fee of ten dollars from one service) is accessible from other services, the media guidance application may only determine if the other services grant access in return from a one-time, upfront fee. Alternatively, in some embodiments, the media guidance application may not consider the pricing structure of the service when determining whether or not a media asset is accessible from a particular service. For example, to determine whether or not a media asset (accessible for a one-time, payment upon delivery fee of ten dollars from one service) is accessible from other services, the media guidance application may determine if the other services grant access to the media asset for a fixed monthly fee (irrespective of whether more or less media assets are accessed), through a deferred payment plan, bundled as part of a package of content, and/or included in a subscription to the service.

For example, the media guidance application may compare a first pricing structure for accessing a media asset that is through a first service to a second pricing structure for accessing the media asset through a second service. The media guidance application may then determine whether or not to generate for display content associated with preventing the user from terminating the first service in response to determining the relationship (e.g., same, different, longer shorter, greater total cost, greater per item cost, etc.) between the first and second pricing structure.

In some embodiments, the media guidance application may determine whether or not a media asset is part of a series of media assets. For example, the media guidance application may determine whether or not a media asset is accessible based on whether a series of media asset of which that media asset is a part is accessible and may determine whether or not a media asset is accessible from the different services based on whether a series of media asset of which that media asset is a part is accessible. As referred to herein, a series of media assets is a group or a number of related media assets that are arranged in a sequence and/or share common characteristics (e.g., plot lines, characters, settings, cast and/or crew, producers, etc.) that distinguish them from other media assets. For example, a series of media asset may include a television program series (e.g., featuring one or more episodes), a movie series (e.g., featuring one or more individual movies), etc.

For example, the media guidance application may determine that an episode of a television series is accessible from one service based on the television series being accessible from that service. In some embodiments, the media guidance application base the determination of whether the episode is accessible from other sources based on whether or not the television series is accessible. Alternatively, in some embodiments, the media guidance application may not base the determination of whether the episode is accessible from other sources based on whether or not the television series is accessible. For example, to determine whether or not a media asset (accessible as part of a series of media assets that are accessible through one service) is accessible from other services, the media guidance application may determine if the other services grant access to the entire series or just the single episode.

In some embodiments, the media guidance application may determine a rate at which the media asset (or a series of media assets) is accessible from the different services. The media guidance application may use this information to determine whether or not a media asset is accessible from a service. For example, the media guidance application may determine that a television series is accessible from one service at a rate of one episode a week. The media guidance application may also determine that the same television series is accessible from another service at a rate of two episodes a week.

For example, in some embodiments, the media guidance application may the rate at which media assets can be consumed when determining whether or not a media asset is accessible from a particular service. For example, to determine whether or not a media asset (accessible at a first rate) is accessible from other services, the media guidance application may only determine if the other services grant access at the same rate. Alternatively, in some embodiments, the media guidance application may not consider the rate at which media assets can be consumed when determining whether or not a media asset is accessible from a particular service. For example, to determine whether or not a media asset (accessible at a first rate) is accessible from other services, the media guidance application may determine if the other services grant access to the media asset (irrespective of whether or not the rate at which a user can consume the media asset is greater than, less than, or equal to the first rate).

For example, the media guidance application may compare a first rate at which a user may consume media assets through a first service to a second rate at which a user may consume media assets through a second service. The media guidance application may then determine whether or not to generate for display content associated with preventing the user from terminating the first service in response to determining the relationship (e.g., greater than, less than, or equal to the first rate) between the first and second rates.

In some embodiments, the media guidance application may determine a rate at which a user consumes media content. The media guidance application may express the rate of consumption in corresponding units. As referred to herein, a "rate of consumption" refers to an average rate at which a user consumes media assets during a period of time. In some embodiments, the "average" may be determined based on a mean, median, mode, or other statistical tool. In some embodiments, the media guidance application may compare the rate of consumption to a threshold rate. For example, a threshold rate may correspond to a rate of consumption of media content from a service at which the media guidance application determines (e.g., with a particular likelihood) that the user is likely to terminate his use of the service. For example, the rate of consumption of the user may correspond to an amount of content consumed (e.g., a number of media assets, a number of hours during which the user viewed programming, a number of episodes, season, series, etc., and/or any other measure of content consumed) over a period of time (e.g., hours, days, weeks, etc.) to a threshold rate (e.g., in the same units of measure). If the media guidance application determines that the rate of consumption of the user is less than the threshold rate the media guidance application may determine the user is likely to terminate the service from which the user accesses the media content.

Throughout this disclosure, various thresholds are discussed. It should be noted that a threshold is a measurement, typically in the same units of measure as the measurement against which it is compared. Furthermore, the value of the threshold (as well as the units of measure) may be determined based on numerous sources. For example, the media guidance application may determine a value of a threshold based on data related to a user or based on industry data, market research, etc. For example, a threshold that determines when a user is likely to terminate a service may be based on the prior actions of one or more users.

In some embodiments, the rate of consumption may be indicated by a viewing history. As referred to herein, "a viewing history" refers to a collection of information related to media content consumed by a user. For example, the viewing history may indicate an amount of media content consumed by the user, the rate of media content consumed by the user, particular times when a user consumed media content, user preferences for media content consumed by the user, and/or any other information related to the consumption of media content by the user. In some embodiments, the viewing history may indicate user preference or characteristics of media content preferred by the user. As used herein, a "characteristic" refers to any attribute of a media asset, series of media asset, and/or type of media asset that distinguishes the media asset, series of media asset, and/or type of media asset from other media assets, series, and/or types.

For example, the viewing history may indicate that a user prefers (or does not prefer) a particular genre of media assets, series of media assets, media assets featuring a particular actor. In some embodiments, the viewing history and characteristics in the viewing history may be used as criteria for recommending media content to a user. For example, the media guidance application may determine the characteristics of media assets that a user has already consumed and recommend other media assets with similar characteristics. For example, in some embodiments, the media guidance application may filter available media assets based on whether or not the available media assets have a characteristics indicated by the viewing history as favorable to the user.

The media guidance application may generate the viewing history and the list of characteristics preferred by the user in the viewing history based on active (e.g., querying the user regarding his or her likes and dislikes) or passive (e.g., tracking the media assets selections of the user without notifying the user) monitoring. In some embodiments, the media guidance application may allow a user to enter information (e.g., preferred characteristics) into the viewing history.

The media guidance application may determine whether or not a media asset is accessible (as well as the price, format, etc. stated above) based on information received from one or more services. For example, the media guidance application may receive media guidance data (e.g., scheduling information, available media assets, etc.) as well as information regarding price, format, etc. from a database associated with a service. Alternatively or additionally, the media guidance application may compile information about various services (e.g., based on publicly available information, market research, known contractual relationship between content providers and services, etc.).

For example, the media guidance application may search for alternative sources of a media asset (or a series of media assets of which the media asset is included) in response to determining that the user prefers the media asset, the media asset was purchased by the user, the media asset is accessible via a service to which a user is nearing an ending date of a subscription, etc. For example, the media guidance application may query a database (e.g., associated with each service) listing media guidance data such as scheduled broadcast times, on-demand programming, product or service offerings, supply contracts, etc., for each content source regarding media assets accessible from that service.

In some embodiments, the media guidance application may filter media guidance data in the database based on whether or not the media guidance data relates to the media asset. The media guidance application may then receive an output of all media guidance data (e.g., including scheduling and accessibility information for the media asset). The media guidance application may then use the outputted media guidance data to determine whether the media asset will be accessible to the user from that service.

In some embodiments, the media guidance application may receive user inputs identifying alternative services to which the user subscribes. For example, a user may enter the various services from which the user has authorization or a desire to receive media content as well as service that facilitate the user access to media content. The media guidance application may store the services available to, or authorized by, the user. The media guidance application may then retrieve the stored services and search them for scheduling and accessibility information.

Alternatively or additionally, the media guidance application may automatically aggregate authorization and/or subscription data for various services from which a user may access media content. For example, the media guidance application may store password, login, payment, and/or other subscription data for the user for one or more services. In response to determining a need for determining scheduling and/or accessibility information (e.g., in response to a user subscribing to a new service), the media guidance application may access the data to the one or services to determine whether or not a user is likely to terminate its relationship with an existing service.

In some embodiments, the media guidance application may generate for display, content associated with preventing the user from terminating the service. As used herein, such "content" is any media asset or media content (as described herein) aimed at preventing the user from terminating a service (whether or not the media asset or media content is successful in preventing a user from terminating a service).

For example, in response to determining that a user is likely to terminate his use of or subscription to a service, the media guidance application may generate for display content selected as to urge the user to not terminate the service such as discounts, special offers, upcoming promotions or media assets available through the service, etc.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
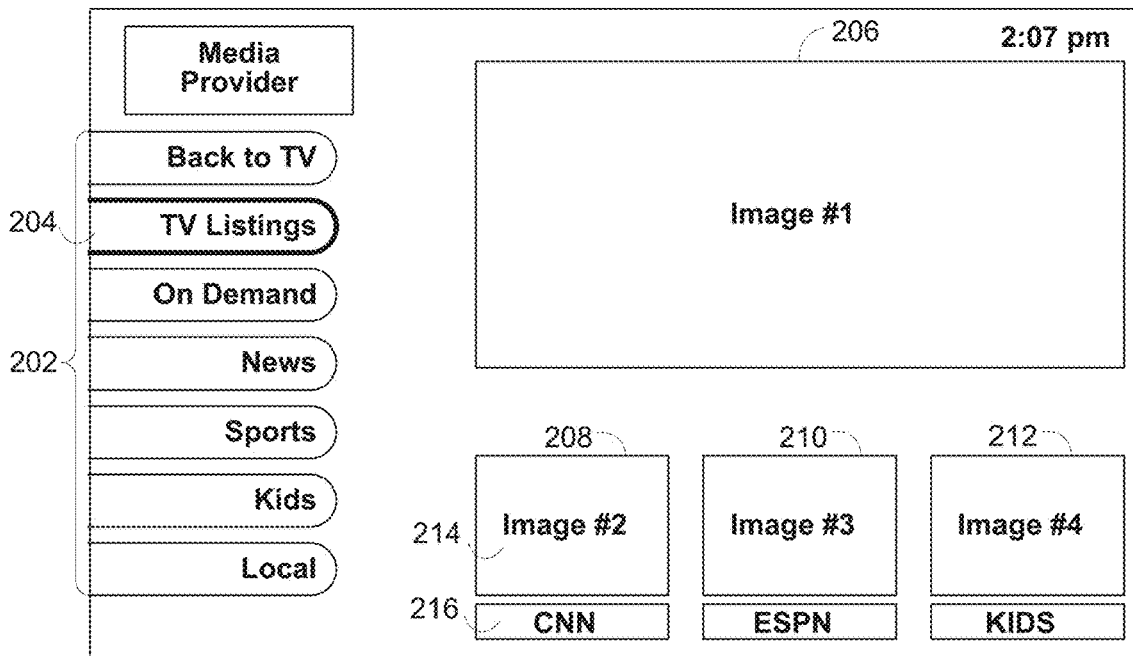
FIG. 2 shows another illustrative example of a display screen generated by a media guidance application in accordance with some embodiments of the disclosure.
Figure 5:
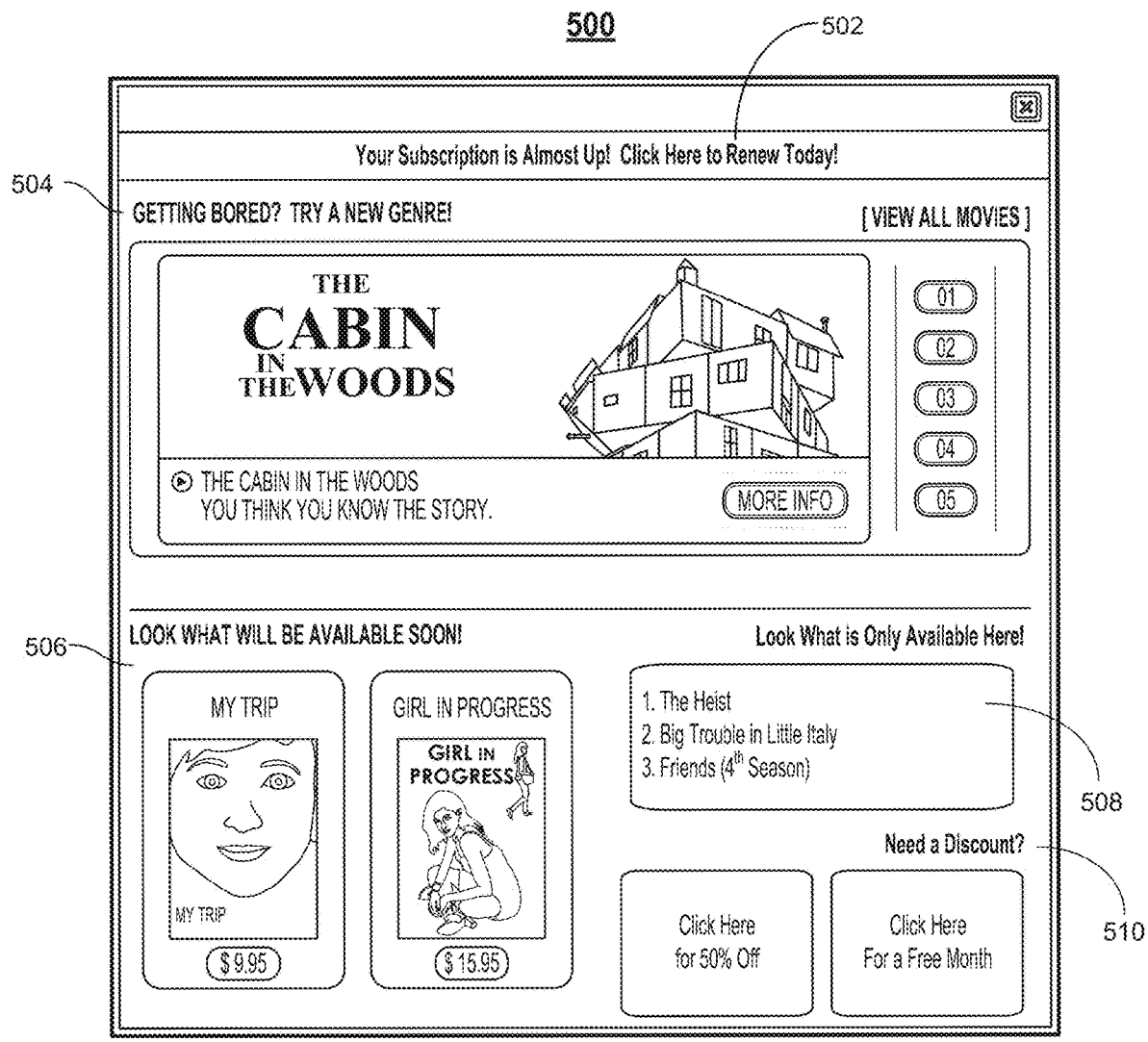
FIG. 5 shows an illustrative example of a display screen generated by a media guidance application presenting content associated with preventing a user from terminating a service in accordance with some embodiments of the disclosure.

FIGS. 1-2 and 5 show illustrative display screens that may be used to provide media guidance data. The display screens shown in FIGS. 1-2 and 5 may be implemented on any suitable user equipment device or platform. While the displays of FIGS. 1-2 and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options accessible through a main menu display. Features related to program listings may include searching for other air times or ways of receiving a program, recording a program, enabling series recording of a program, setting program and/or channel as a favorite, purchasing a program, or other features. Options accessible through a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
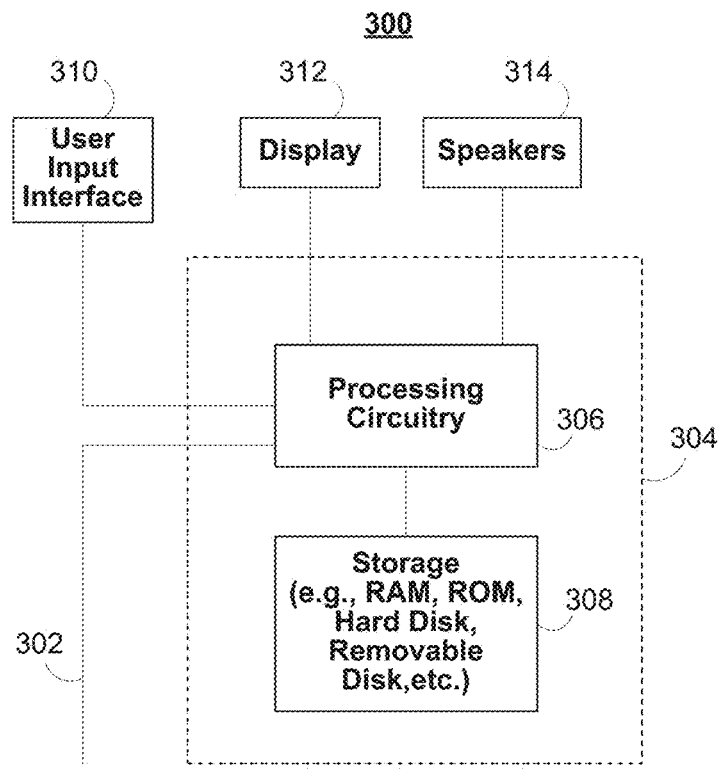
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
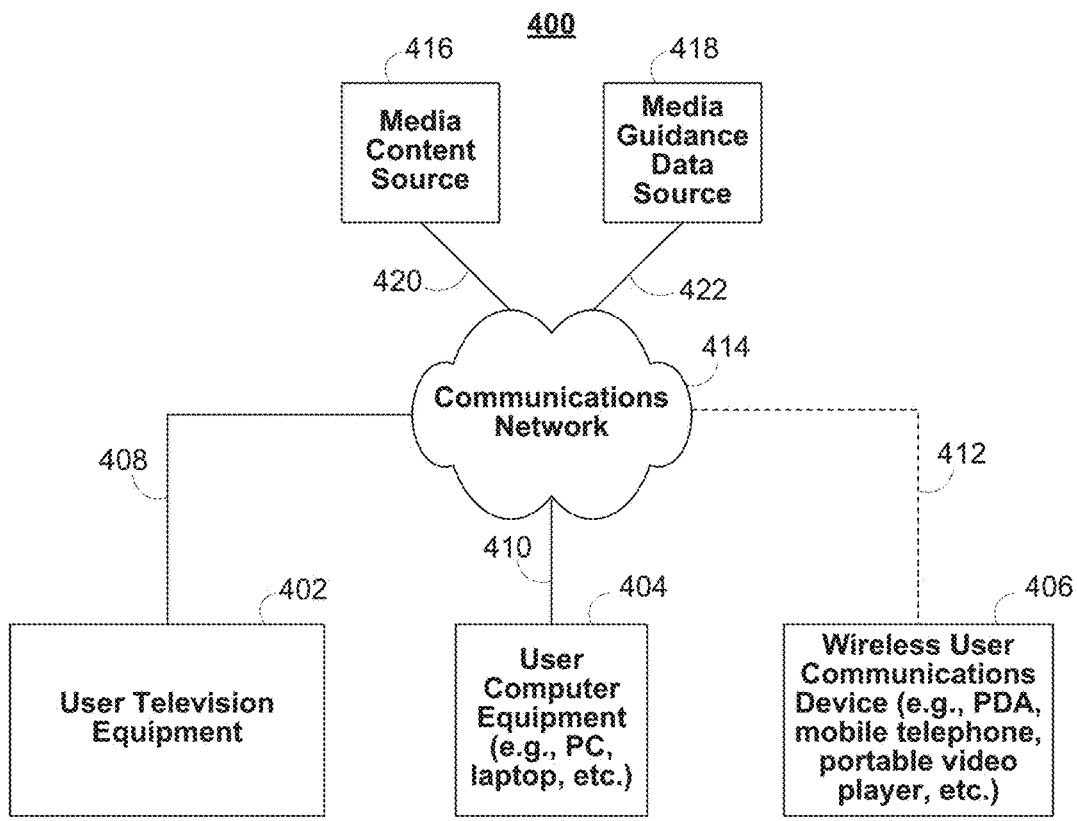
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 includes an illustrative example of a display that has generated for display, content associated with preventing the user from terminating the service. For example, in response to determining that a user is likely to terminate his use of or subscription to a service, the media guidance application may generate for display content selected as to urge the user to not terminate the service. For example, in response to determining that a subscription of the user to the service is about to expire, the media guidance application may generate for display one or more portions of the content presented in display 500. In another example, in response to determining that a user may terminate the use of the service and begin using a different service, the media guidance application may generate for display one or more portions of the content presented in display 500.

In some embodiments, the media guidance application may determine that a particular series of media assets is a favorite of the user. For example, the media guidance application may determine that the user has consumed media assets of that series at a rate higher than the rate at which the user consumed other media assets or has not consumed any media assets other than those in the series during a particular time period. In response to determining that the user has consumed all of those media assets or is about to consume all of those media assets, the media guidance application may generate content associated with preventing the user from terminating the service. In another example, the media guidance application may determine that the user has consumed media assets of that series at a rate higher than the rate at which the user consumed other media assets or has not consumed any media assets other than those in the series during a particular time period. Moreover, the media guidance application may determine that a media asset (or the entire series of media assets) is accessible from another service. In response, the media guidance application may generate content associated with preventing the user from terminating the service (and using the other service).

Additionally or alternatively, the media guidance application may track the rate at which a user consumes media assets from the service in a viewing history of the user. The media guidance application may determine that the rate has decreased over a particular amount of time. For example, the media guidance application may determine that during the first month of the service, the user consumed media assets at a rate of five per week. The media guidance application may also determine that during the second month of the service, the user consumed media assets at a rate of three per week. Finally, the media guidance application may also determine that during the third month of the service, the user consumed media assets at a rate of one or less media assets a week. The media guidance application may cross-reference this data in a database that indicates such behavior (e.g., the decreasing rate of use of the service) indicates that a user is getting bored with the service and is therefor more likely to terminate the user of the service. In response, the media guidance application may generate content associated with preventing the user from terminating the service.

For example, the media guidance may generate for display content aimed at causing the user to re-engage the service and thus prevent the user from terminating his service. In some embodiments, the media guidance application, in response to determining that the current rate does not correspond to the threshold rate (e.g., a rate at which the media guidance application determines a user is likely to terminate the user of the service), determining a characteristic not associated with media assets previously consumed by a user and recommending a media asset associated with the characteristic.

In another example, the media guidance application may determine that the rate change is due to the user using another service (e.g., the time period of the rate change corresponds to time period corresponding to the using beginning the use of the other service). In response, the media guidance application may generate content associated with preventing the user from terminating the service (or terminating the use of the other service).

Additionally or alternatively, the media guidance application may monitor the brain state or attentiveness of the user. For example, the media guidance application may monitor for an occurrence (e.g., particular brainwave frequency ranges, particular eye blinking patterns, a particular level of eye content, particular emotional responses, etc.) or a series of occurrences over a period of time that indicate that a user is losing interest in the media asset offered by the service, dislikes the media assets offered by the service, is not attentive when using the service, is growing sleepy when using the service, etc. In response to detecting such occurrences the media guidance application may generating for display content associated with preventing the user from terminating the service.

In another example, the media guidance application may determine that the brain state indicates that a user prefers another service (e.g., the mood, attentiveness, eye content, etc. of the user is higher when the user is using the other service). In response, the media guidance application may generate content associated with preventing the user from terminating the service (or terminating the use of the other service).

Additionally or alternatively, the media guidance application may determine that a particular media asset that is accessible to the first user using the first service (e.g., a cable television channel) is also accessible to the user using a second service (e.g., an Internet provider than provides increase bandwidth which may be used by the user to stream the media asset from a separate content provider). In response to determining the media asset is accessible through both the first service and the second service, the media guidance application may generate for display, on a display device, content associated with preventing the user from terminating the first service.

Additionally or alternatively, the media guidance application may determine, based on a purchase history for a user that indicates media assets purchased by a user, that a number of media assets that were purchased by the user from a current service that are not accessible through a second service. The media guidance application may then compare the number of media assets to a threshold number. For example, the media guidance application may determine whether or not the number of media assets purchased from the current service that are not accessible from another service indicates that user is likely to remain with the current service. For example, if the user purchases numerous media assets from the current service that are not accessible from another service, the user is less likely to stop using the current service (in lieu of the other service) than if the user purchases only a few media assets from the current service that are not accessible from another service.

Display 500 includes numerous types of content associated with preventing the user from terminating the service. For example, display 500 includes numerous media assets aimed at providing one or more reasons for the user to retain the use of the service or to renew a subscription to the service. For example, display 500 includes icon bar 502. Icon bar 502 notifies the user (e.g., via a textual message) that the subscription of the user to the service is almost expired. Furthermore, icon bar 502 urges the user to select icon bar 502 to renew his subscription. For example, in some embodiments, selection of icon bar 502 may direct the user to an order form, which the user can use to renew the subscription. Alternatively, selection of icon bar 502 may automatically authorize the service to charge the user and renew the subscription of the user to the service.

Display 500 also includes recommendation 504. Recommendation 504 is content associated with preventing a user from terminating the service. For example in response to determining that a user is increasingly becoming bored with the media assets offered by the service, the media guidance application may offer recommendations for other media assets. Furthermore, as the user has likely already perused the media assets in a favorite category or genre (or consumed all the media assets in a particular series), the media guidance application may recommend media assets in a category or genre that is not a favorite of the user (e.g., in order to raise awareness to the user of available media assets that are not known or were previously discounted by the user). Likewise, in response to determining that a user has consumed all the media assets in a particular series, the media guidance application may recommend media assets in a different series.

Accordingly, the media guidance application may determine particular characteristics (e.g., genre, subject matter, series affiliation) of the media assets consumed by the user and recommend of media assets that do not share (or share only some of those characteristics). Additionally or alternatively, the media guidance application may determine which available media assets have not yet been consumed by the user and limit the recommendations to those media assets.

Display 500 also includes recommendation notification 506. Notification 506 may alert a user to media assets that, while not currently accessible to a user (e.g., have not yet been released) will soon be accessible to a user. In some embodiments, notification 506 may also include additional information (e.g., price and scheduling data). Additionally or alternatively, notification 506 may indicate to a user one or more media assets that are only accessible through a current service as well as indicate one or more media assets (e.g., favorite media assets of the user) that are not accessible from other services.

Display 500 may also include media listings 508. Media listings 508 may indicate to a user one or more media assets that are available through a current service (e.g., in order to entice a user to remain with the service) or one or more media assets that are not available through another service (e.g., in order to entice a user to not use or stop using that service). In some embodiments, media listings 508 may also include additional information (e.g., price and scheduling data) about media assets accessible from the current service. Additionally or alternatively, the media guidance application may include additional information about media assets available from another service. For example, Media listings 508 may include information that may be used by a user to compare the price and schedule (e.g., date when a media asset is accessible to the user via each service).

In some embodiments, the media guidance application may list all media assets accessible through the first service in media listings 508. Alternatively, the media guidance application may select the media listings presented in media listings 508 based on one or more criteria. For example, the media guidance application may select the media listings in response to determining that a user has not consumed those media assets, that the media assets are highly rated, that the media assets match user preferences of the user, that the price and/or scheduling data for each of those media assets is more favorable that the price and/or scheduling data from another service, etc. For example, the media guidance application may select media assets that are available to a user and/or at a lower price from a current service of the user than another service (e.g., one recently subscribed to by the user).

Display 500 may also include advertisements 510. For example, advertisements 510 may provide discounts, coupons, and/or other special offers. In some embodiments, advertisements 510 may be linked to a user not terminating a service. For example, the media guidance application may offer a user a discount on the price of a service in response to a user signing up for a new subscription to the service. In some embodiments, the media guidance application may target advertisements 510 to the user based on the viewing history of the user. For example, the media guidance application may determine that the user prefers a particular genre of media assets and may present the user with an offer associated with that genre of media assets.

Figure 6:
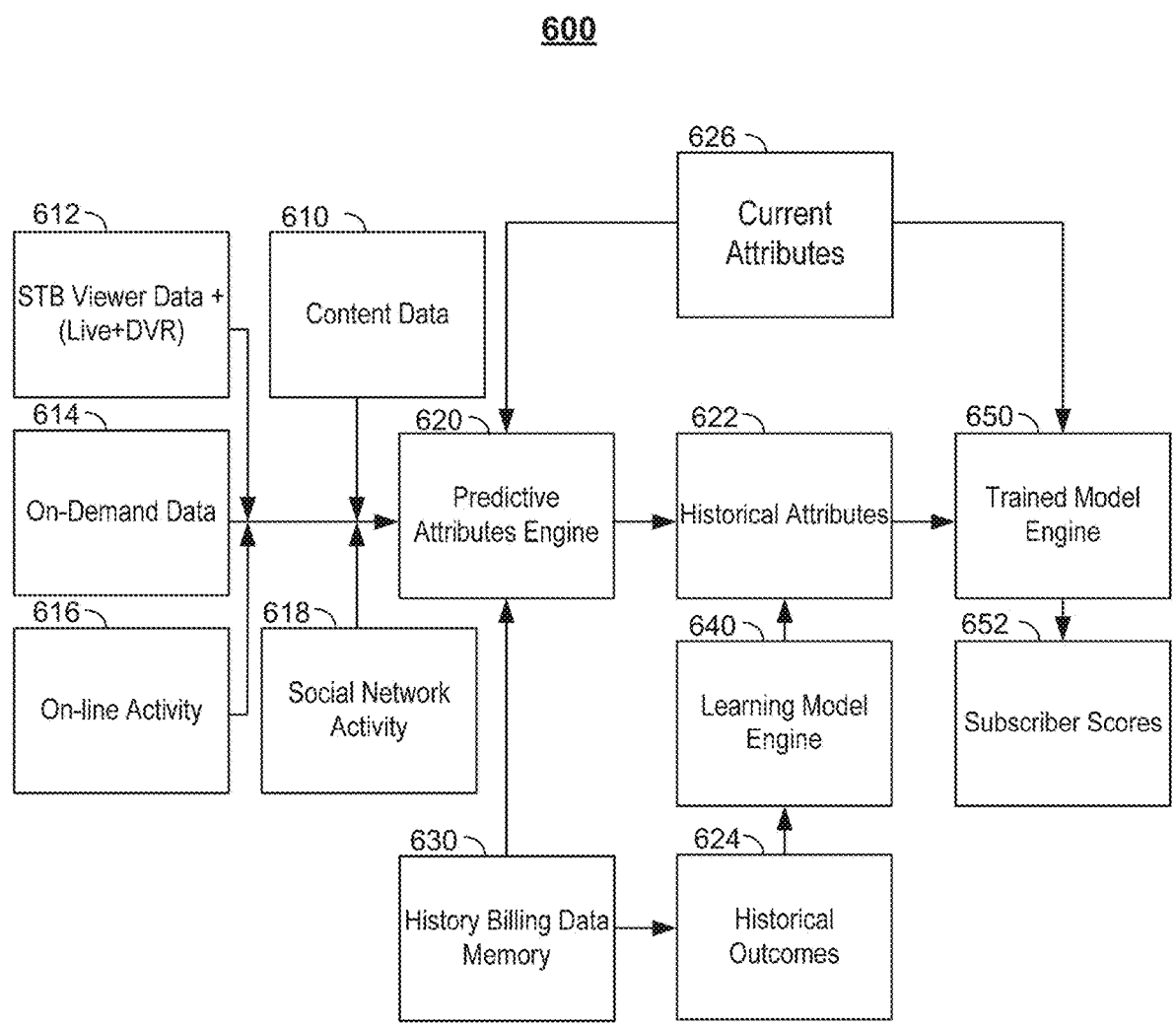
FIG. 6 is an illustrative system for generating an indicator of the likelihood that a user will terminate access to a service or source in accordance with some embodiments of the disclosure.

FIG. 6 is an illustrative system for generating an indicator of the likelihood that a user will terminate access to a service. For example, in response to determining that a user is likely to terminate the use of a service, the media guidance application may generate for display content associated with preventing a user from terminating the service (e.g., as described in relation to FIG. 5). The components and operation of system 600 may be implemented by circuitry or by software (e.g., control circuitry 304 (FIG. 3)) through the media guidance application. System 600 includes a predictive attributes engine 620, a history of billing data memory 630, a learning model engine 640, and a trained model engine 650. Predictive attributes engine 620 receives data (e.g., content attributes data 610, user equipment viewer data 612 which includes indications about what live and recorded content a user watches, on-demand data 614, online activity data 616, social network activity 618, current user attributes 626, and data from memory 630). On-demand data 614 may indicate which non-linear content the user has previously consumed or purchased. Online activity data 616 indicates what content the user consumed online (e.g., from a streaming source).

Predictive attributes engine 620 processes one or more of the data it receives to generate attributes that represent a population of users with similar activity. The generated attributes 622 are output to learning model engine 640. Learning model engine 640 receives historical outcomes 624 from history billing data memory 630. Historical outcomes 624 indicate what sources or services the user has previously subscribed to and to which sources or services the user has previous terminated access a period of time after subscribing to them. Learning model engine 640 may correlate historical attributes 622 of various users with historical outcomes 624 of those users to determine patterns that resulted in termination of access to sources or services. Historical outcomes 624 may be stored as a database for various users. The database may indicate for each user what sources or services the user has previously subscribed to and to which sources or services the user has previous terminated access a period of time after subscribing to them.

For example, learning model engine 640 may process historical outcomes 624 of a first user to identify a point at which the first user has terminated access to a source or service (e.g., unsubscribed from a premium channel). In some embodiments, the first user may be a former subscriber to a source or service (e.g., a user who completely disconnected service from a particular source, such as a former cable subscriber that switched to satellite). In such circumstances, learning model engine 640 may analyze behavior of the former subscriber corresponding to the viewing activity and subscription activity the former subscriber had before becoming the former subscriber. In particular, leaning model engine 640 may process the viewing activity and subscription activity of a former cable subscriber to determine what cable services the former subscriber subscribed to and/or terminated service from before disconnecting from cable and switching to satellite.

Learning model engine 640 may retrieve historical attributes 622 for that first user for a period of time before the user terminated access and/or a period of time after the user terminated access to detect a change in viewing activity that may have resulted in the user terminating access to the source or service. Learning model engine 640 may perform the same analysis for each other user for which data is available (e.g., in a database for historical outcomes 624) and who terminated access to the same source or service. After processing the data for each user who terminated access to the particular source or service, learning model engine 640 may identify similarities in attributes 622 of those users during the period preceding and/or following each respective user's termination of access to the source or service. Learning model 640 may store a correlation factor between the similar attributes and the particular source or service. The correction factor indicates when a subsequent user who is a subscriber to the same source or service exhibits at least some of the similar attributes, the user will likely terminate access to the source or service. The greater the number of similar attributes that the user exhibits, the larger the score that results from the correlation factor indicating a greater likelihood that the user will terminate access to the source or service. Learning model engine 640 may generate a different correlation factor for each source or service to which a set of users terminated access.

In some embodiments, learning model engine 640 may be trained on an on-going, continuous basis. In particular, learning model engine 640 may continuously process information (e.g., user activity, historical outcomes 624, and subscription information) for each subscriber or user and adapt or change the correlation factor for a given service. The updated correlation factor may be then provided to trained model engine 650. In some implementations, learning model engine 640 may update a previously determined correlation factor each time a given user or set of users terminate access to a particular source or service. For example, each time new information is stored to a database of historical outcomes 624 (e.g., each time a given user unsubscribes or disconnects from a given source or service), a signal identifying the source or service associated with the new information may be transmitted to learning model engine 640 indicating a need to re-compute or update a correlation factor corresponding to the identified source or service.

After a predetermined amount of time and/or after a data from a predetermined number of users has been processed by learning model engine 640, the model may be provided to trained model engine 650. Trained model engine 650 may process current attributes 626 of a given user with each of the correlation factors provided by learning model engine 640 that is associated with a source or service to which the user is a subscriber. Trained model engine 650 may output a score that represents how closely correlated the current user's attributes are with the correlation factor. The score output by trained model engine 650 may be source/service specific. A larger score indicates a greater likelihood that the user will terminate access to the source or service.

The media guidance application may process the score for a given user to target advertisements and promotions. For example, in response to determining that the score of a given user exceeds a first threshold, the media guidance application may identify the source or service associated with the score. The media guidance application may provide a promotion to the user for the source or service (e.g., allow the user to keep the subscription to the source or service at a discounted price). Alternatively, the media guidance application may provide an advertisement for content available on the source or service to the user. In some implementations, in response to determining that the score of a given user exceeds a second threshold higher than the first threshold, the media guidance application may provide a different set of promotions and/or advertisements. If the score is below a threshold, the media guidance application may avoid presenting promotions or advertisements for the source or service.

In some embodiments, in response to determining that the score of a given user is below a threshold, the media guidance application may instruct a subscriber management system to initiate a process for retaining the given user (e.g., by generating content associated with preventing the user from terminating the use of a service). In some embodiments, in response to determining that the score of a given user is below a threshold, the media guidance application may provide a visual alert to an operator of source or service associated with the score. The visual alert may include information that identifies the user, the source or service, and/or the score. For example, the subscriber management system may, based on the instruction from the media guidance application and the score, contact the given user (e.g., place a phone call, send a text message or email) to offer a new offer, discount on other services (e.g., packages of programming), or reduction in price of current services. The offer may be specific to the source or service for which the score is below the threshold or generic. In particular, if the score indicates that the user is likely to terminate access to a premium channel, the subscriber management system may contact the given user offering any combination of: a reduction in the current price the given user is paying for the premium channel, a discount on a new service (e.g., phone service for a cable subscriber), or a discount on a new premium channel not currently subscribed to by the given user. In some implementations, the subscriber management system may apply different offers to different users who have the same scores. The subscriber management system may determine what level of offer to a given user not only based on the score of the user but also based on information stored in historical outcomes 624 for the user and/or currently subscribed to services. For example, if first and second users have the same score for a particular service (e.g., cable) but the first user is not a subscriber to premium channels, the subscriber management system may offer the premium channels (or a set of premium channels that meet a user profile for the first user) at a discount. The second user may already be a subscriber to the premium channels and accordingly the subscriber management system may offer alternate services to the second user at a discount (e.g., phone services if the second user does not currently have phone service).

In some embodiments, trained model engine 650 may receive subscription information for a given user and user activity information. The subscription information may indicate that the user is a subscriber to a premium channel on the source (e.g., HBO on cable) and the user activity information may indicate that the given user has not viewed content from the premium channel in more than a threshold period of time (e.g., more than 2 weeks). In response, trained model engine 650 may identify a correlation factor associated with the premium channel and generate a score indicating that the user is likely to terminate access to the premium channel. The value of the score may be higher or lower based on other user activity and subscription information. For example, if the user watches content from an affiliate of the premium channel (e.g., Cinemax) which is tied to the subscription of the primary channel (e.g., HBO), then the score may be reduced.

In some embodiments, the subscription information may indicate that the user is a subscriber to a premium channel on the source (e.g., HBO on cable) and the user activity information may indicate that the given user has increased the speed of their Internet connection. In response, trained model engine 650 may identify a correlation factor associated with the premium channel and generate a score indicating that the user is likely to terminate access to the premium channel. In particular, the user may have increased Internet speed because they intend to access more content online and may not need the premium channel anymore. The score may be further increased if the above determination is made that the user has not viewed content from the premium source in more than a threshold period of time (e.g., more than 2 weeks).

In some embodiments, the subscription information may indicate that the user has purchased a predetermined number of movies from a source (e.g., a certain cable provider) and the activity information may indicate that the user watches non-premium content sources (e.g., free TV). In response, the score output by trained model engine 650 may be reduced as the user is less likely to terminate access to the source (e.g., disconnect service from the cable provider). In some implementations, the subscription information may indicate that the user is a subscriber to a cable provider and the user activity information may indicate that the given user watches new releases on-demand from the cable provider. In response, the score corresponding to the cable provider output by trained model engine 650 may be decreased as the user is unlikely to terminate access to the cable provider as there may not be an alternate source from which the user can obtain access to the new releases. In some implementations, the subscription information may indicate that the user is a subscriber to a cable provider and the user activity information may indicate that the given user does not watch many live events (e.g., linear content) and has increased the Internet speed. In response, the score corresponding to the cable provider output by trained model engine 650 may be increased as the user is likely to terminate access to the cable provider as the user may be looking to stream more content from an online source. In some implementations, the subscription information may indicate that the user is a subscriber to a cable provider and the user activity information may indicate that the given user watches many live events (e.g., linear content) and comments on a social network about the live events. In response, the score corresponding to the cable provider output by trained model engine 650 may be decreased as the user is unlikely to terminate access to the cable provider. In some implementations, the subscription information may indicate that the user is a subscriber to a cable provider and the user activity information may indicate that the given user watches a variety of content. In response, the score corresponding to the cable provider output by trained model engine 650 may be decreased as the user is unlikely to terminate access to the cable provider.

In some implementations, the subscription information may indicate that the user is a subscriber to a premium channel on the source (e.g., HBO on cable) and the user activity information may indicate that the given user has subscribed to a different premium channel (e.g., Showtime on cable). In response, the score corresponding to the HBO premium channel output by trained model engine 650 may be increased as the user is likely to terminate access to the HBO premium channel given that the user will consume content from the other premium channel. In some implementations, the subscription information may indicate that the user is a subscriber to a premium channel on the source (e.g., HBO on cable) and the user activity information may indicate that the given user only watches a certain show on the premium channel that has recently ended (e.g., the season of the show has finished). In response, the score corresponding to the HBO premium channel output by trained model engine 650 may be increased as the user is likely to terminate access to the HBO premium channel given that the user will no longer have content to consume from the premium channel.

Figure 7:
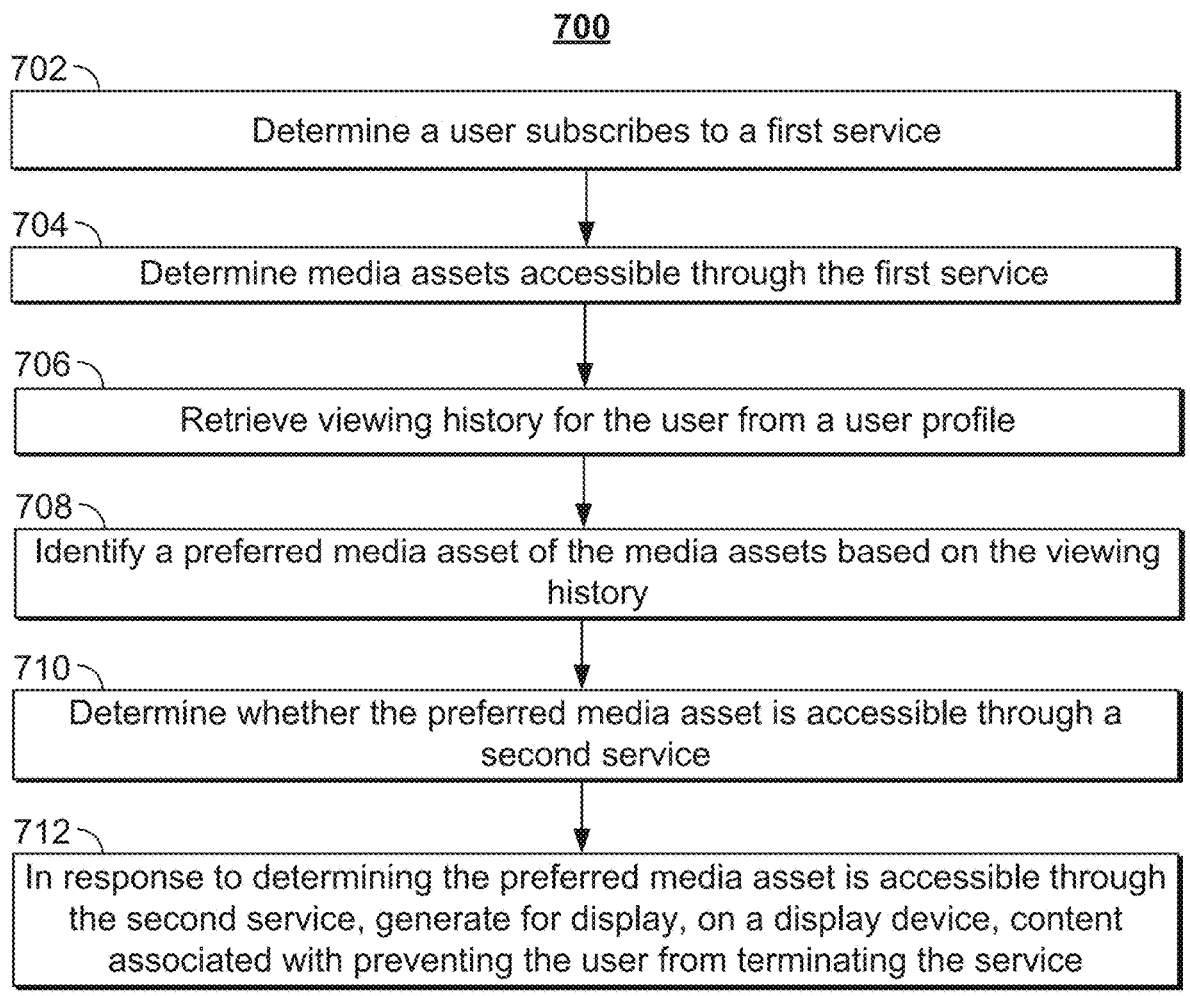
FIG. 7 is a flowchart of illustrative steps for generating for display content associated with preventing the user from terminating the service in response to determining a media asset is accessible through both a first service and a second service in accordance with some embodiments of the disclosure.

FIG. 7 is a flowchart of illustrative steps for generating for display content aimed at preventing the user from terminating a service. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to generate for display content aimed at preventing the user from terminating a service. In addition, one or more steps of process 800 may be incorporated into or combined with one or more steps of any other process or embodiment (e.g., as described in relation to FIG. 7)).

At step 702, the media guidance application determines (e.g., via control circuitry 304 (FIG. 3)) a user is subscribed to a first service. For example, the media guidance application may store (e.g., in a user profile at storage 308 (FIG. 3) and/or any location accessible via communications network 414 (FIG. 4)) a list of services subscribed to by the user. In another example, the media guidance application may determine (e.g., via control circuitry 304 (FIG. 3)) services subscribed to by the user based on data related to the services.

For example, the media guidance application may receive (e.g., via I/O path 302 (FIG. 3)) billing or credit cards statements addressed to the user. The media guidance application may then determine (e.g., via control circuitry 304 (FIG. 3)), based on the received statements, the services that correspond to the statements (e.g., the services subscribed to by the user). In another example, the media guidance application may receive (e.g., via I/O path 302 (FIG. 3)) authorization data transmitted by the service. For example, the media guidance application may detect particular services that grant access to an account of the user. In some embodiments, the media guidance application may periodically query the various services to determine whether or not accessed is granted. In yet another embodiment, the media guidance application may receive user inputs (e.g., via user input interface 310 (FIG. 3)) that identify one or more services subscribed to by the user.

At step 704, the media guidance application determines (e.g., via control circuitry 304 (FIG. 3)) media assets accessible through the first service. For example, in response to determining the user subscribes to the first service, the media guidance application may retrieve (e.g., from media content source 416 (FIG. 4) a list of media assets accessible from that media asset. For example, the media guidance application may poll the service or a database of listings accessible from the service (e.g., located at any location accessible via communications network 414 (FIG. 4)) for media assets that are currently (or in the future) accessible to the user.

At step 706, the media guidance application retrieves a viewing history for the user from a user profile (e.g., located at storage 308 (FIG. 3) and/or any location accessible via communications network 414 (FIG. 4)). For example, the media guidance application may monitor (e.g., as discussed in relation to FIG. 6) the media assets consumed by the user, the length of time that media assets were consumed, the rate at which media assets were consumed, etc. The media guidance application may then compile the monitored information into a viewing history.

At step 708, the media guidance application identifies (e.g., via control circuitry 304 (FIG. 3)) a preferred media asset of the media assets accessible from the first service based on the viewing history. For example, the media guidance application may determine (e.g., via control circuitry 304 (FIG. 3)) media assets (or a particular series of media assets) that are viewed with a greater frequency by the user relative to other media assets. The media guidance application may also determine if episodes of a series are watched continuously (e.g., back-to-back without a break in between episodes) at a greater rate than other series of media assets, different media assets, etc.

For example, the media guidance application may determine (e.g., via control circuitry 304 (FIG. 3)) a media asset is part of a series of media assets (e.g., serial programming) of which the user has been consuming. The media guidance application may also receive an indication from the viewing history of a rate at which the user has consumed the series of media assets over a time period. For example, the rate may indicate the number of media assets of a particular series that have been consumed over a period of time. Additionally or alternatively, the rate may indicate a ratio of the amount of time spent by a user consuming media assets of the series to the amount of time between the user consuming media assets of the series.

For example, the media guidance application may use the rates discussed above to determine whether or not a user is "hooked" on a particular a television series. If the media guidance application determines that a user is "hooked" the media guidance application may base a determination of whether or not a user is likely to terminate a service based on whether or not the service (or other services) provide the user access to the television series.

In some embodiments, the media guidance application may compare (e.g., via control circuitry 304 (FIG. 3)) the rate of the user to threshold rates (e.g., indicating an average time, ratio, etc. at which the user normally consumes media assets, at which other users normally consume media assets, etc.). The media guidance application may retrieve the threshold rates from memory (e.g., storage 308 (FIG. 3) and/or any location accessible to communications network 414 (FIG. 4)). For example, the media guidance application may determine the threshold rates based the prior viewing history of the user or may retrieve the threshold rate from another source that bases the rate on industry standards, market research, etc.

In some embodiments, the media guidance application identifies (e.g., via control circuitry 304 (FIG. 3)) a preferred media asset of the media assets by comparing the rate at which the user has consumed the series of media assets to a threshold rate (e.g., indicate an average rate at which the user consumes media assets). The media guidance application may then determine (e.g., via control circuitry 304 (FIG. 3)) the preferred media asset in response to determining the rate exceeds the threshold rate. For example, in response to determining that a user is binge watching a particular television series, the media guidance application may determine that the television series (or an episode of the television series) is a preferred media asset.

At step 710, the media guidance application determines (e.g., via control circuitry 304 (FIG. 3)) whether the preferred media asset is accessible through a second service. For example, the media guidance application may cross-reference (e.g., via control circuitry 304 (FIG. 3)) a database (e.g., located at storage 308 (FIG. 3) and/or communications network 414 (FIG. 4)) listing services that provide the preferred media asset to determine (e.g., via control circuitry 304 (FIG. 3)) whether the preferred media asset is accessible through a second service. Alternatively or additionally, the media guidance application may query (e.g., via control circuitry 304 (FIG. 3)) each service for a list of media assets (or series of media assets) currently available (or available in the future) and compare (e.g., via control circuitry 304 (FIG. 3)) the results of the queries.

In response to determining the preferred media asset is accessible through the second service, the media guidance application may generate for display, on a display device, content associated with preventing the user from terminating the service. For example, the media guidance application may (e.g., via control circuitry 304 (FIG. 3)) generate for display, on a display device (e.g., display 312 (FIG. 3)), content associated with preventing the user from terminating the first service. For example, the media guidance application may generate for display discounts to the price of the first service or alert the user to media assets that are only accessible (currently or in the future) through one of the services.

Alternatively, the media guidance application may (e.g., via control circuitry 304 (FIG. 3)) not generate for display, on the display device (e.g., display 312 (FIG. 3)), the content associated with preventing the user from terminating the service in response to determining (e.g., via control circuitry 304 (FIG. 3)) that preferred media asset is not accessible on the second service. For example, the media guidance application may determine (e.g., via control circuitry 304 (FIG. 3)) that a user is unlikely to terminate the use of the first service. Therefore, the media guidance application determines (e.g., via control circuitry 304 (FIG. 3)) that generating the content associated with preventing the user from terminating the first service is unnecessary.

In yet another example, the media guidance application may determine (e.g., via control circuitry 304 (FIG. 3)) whether the preferred media asset is accessible through a second service in response to determining that a subscription period for the first service is ending, and generate content featuring offers to renew the subscription of the user.

In some embodiments, the media guidance application may compare (e.g., via control circuitry 304 (FIG. 3)) additional information about the first and second service in order to determine (e.g., via control circuitry 304 (FIG. 3)) whether or not to generate for display the content associated with preventing the user from terminating the service. For example, the media guidance application may compare (e.g., via control circuitry 304 (FIG. 3)) the price or release date of a preferred media asset, and only generate the content in response to determining the price or release date of the media asset from the second service is superior to that of the first service.

For example, the media guidance application may compare (e.g., via control circuitry 304 (FIG. 3)) a first price for accessing the preferred media asset through the first service to a second price for accessing the preferred media asset through the second service. The media guidance application may then determine (e.g., via control circuitry 304 (FIG. 3)) not to generate for display, on the display device, the content associated with preventing the user from terminating the first service in response to determining that the first price is less than the second price. For example, the media guidance application may determine that the lower price is itself an incentive to remain with the first service.

In another example, the media guidance application may compare (e.g., via control circuitry 304 (FIG. 3)) a first date when the preferred media asset is accessible through the first service to a second date when the preferred media asset is accessible through the second service. The media guidance application may then determine (e.g., via control circuitry 304 (FIG. 3)) not to generate for display, on the display device, the content associated with preventing the user from terminating the first service in response to determining that the first date is before the second date. For example, the media guidance application may determine that the earlier release date is itself an incentive to remain with the first service.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
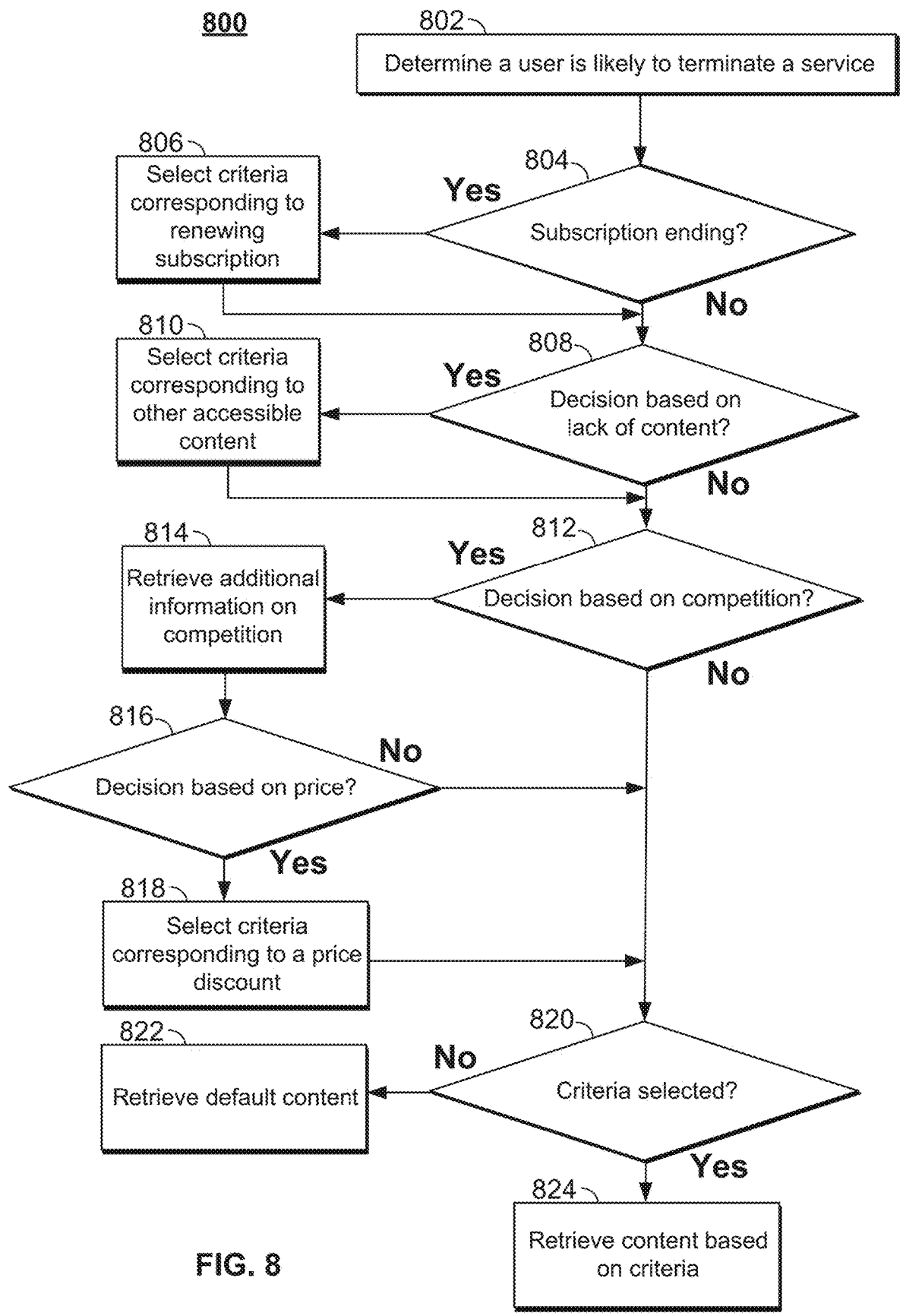
FIG. 8 is a flowchart of illustrative steps for generating for display content associated with preventing the user from terminating the service in response to determining that the number does not exceed the threshold number in accordance with some embodiments of the disclosure.

FIG. 8 is a flowchart of illustrative steps for selecting content associated with preventing a user from terminating the service. It should be noted that process 800 or any step thereof could be performed on, or provided by, any of the devices shown in FIGS. 3-4. For example, process 800 may be executed by control circuitry 304 (FIG. 3) as instructed by a media guidance application implemented on a user device (e.g., user equipment devices 402, 404, and/or 406 (FIG. 4)) in order to generate for display content associated with preventing the user from terminating the service. In addition, one or more steps of process 800 may be incorporated into or combined with one or more steps of any other process or embodiment (e.g., as described in relation to FIG. 8)).

At step 802, the media guidance application determines that a user is likely to terminate a service. For example, the media guidance application may determine that a user is likely to terminate a service as described in relation to FIGS. 6-7. For example, the media guidance application may determine (e.g., via control circuitry 304 (FIG. 3)) that a preferred media asset is accessible through a second service. Furthermore, the media guidance application may determine that the user has subscribed to the second service, the terms (e.g., price, release date, format, etc.) of the second service are more favorable, and/or that the subscription of the user to the first service expires soon.

At step 804, the media guidance application determines (e.g., via control circuitry 304 (FIG. 3)) whether or not a subscription of the user is ending. For example, the media guidance application may determine that the user is subscribed to the service for a particular amount of time (e.g., a month, year, etc.) and that amount of time is coming to an end. If so, the media guidance application proceeds to step 806 and selects (e.g., via control circuitry 304 (FIG. 3)) criteria corresponding to renewing a subscription of the user before proceeding to step 808. For example, if the media guidance application determines (e.g., via control circuitry 304 (FIG. 3)) that the subscription of the user is ending, the media guidance application may generate content associated with renewing the subscription of the user (e.g., icon bar 502 (FIG. 5)).

If the media guidance application determines (e.g., via control circuitry 304 (FIG. 3)) that a subscription of the user is not ending at step 804, the media guidance application proceeds to step 808. For example, if the subscription of the user in not nearing an end then the media guidance application determines not to generate content associated with renewing the subscription of the user (e.g., icon bar 502 (FIG. 5)).

At step 808, the media guidance application determines (e.g., via control circuitry 304 (FIG. 3)) whether or not the decision to terminate the use of the service is related to a lack of content. For example, the media guidance application may determine that the user has watch a large portion of the content accessible from the service, has watched the most popular portions of the content accessible from the service (e.g., based on the preferences of the user, critical reviews, ratings, and/or editorial recommendations), etc. If so, the media guidance application proceeds to step 810 and selects (e.g., via control circuitry 304 (FIG. 3)) criteria corresponding to presenting other content accessible to the user using the service before proceeding to step 812. For example, if the media guidance application determines (e.g., via control circuitry 304 (FIG. 3)) that the user has watched a large portion of content, the media guidance application may generate content associated with presenting other content available to the user (e.g., notification 506 (FIG. 5)) and media listings 508 (FIG. 5)).

If the media guidance application determines (e.g., via control circuitry 304 (FIG. 3)) that the decision to terminate the use of the service is not related to a lack of content at step 808, the media guidance application proceeds to directly to step 812. For example, if the decision to terminate the use of the service is not related to a lack of content then the media guidance application may determine not to present other content available to the user (e.g., notification 506 (FIG. 5)) and media listings 508 (FIG. 5)).

At step 812, the media guidance application determines (e.g., via control circuitry 304 (FIG. 3)) whether or not the decision to terminate the use of the service is related to competition. For example, the media guidance application may determine (e.g., via control circuitry 304 (FIG. 3)) that content the user enjoys is accessible from another content provider. In another example, the media guidance application may determine (e.g., via control circuitry 304 (FIG. 3)) that a user recently signed up for another service that directly or indirectly provides media content. If not, the media guidance application proceeds to step 820.

If so, the media guidance application proceeds to step 814 and retrieves additional information on the competition before proceeding to step 816. For example, if the decision of the user to terminate his or her service is based on competition, the media guidance application may determine (e.g., via control circuitry 304 (FIG. 3)) the price and accessibility information (e.g., what media assets are available and when) for the competition. In some embodiments, the media guidance application may determine the price and/or scheduling data for each media assets that is more favorable with the current provider than the price and/or scheduling data for the competition. For example, the media guidance application may select media assets that are available to a user and/or at a lower price from the current service of the user than another service (e.g., one recently subscribed to by the user).

At step 816, the media guidance application determines whether or not the decision of the user to terminate the service was based on price. For example, if some media content (or the media content preferred by the user) is accessible from another service at a lower price, the media guidance application may determine that the decision of the user to terminate the service was based on price. If so, the media guidance application proceeds to step 818 and selects (e.g., via control circuitry 304 (FIG. 3)) criteria corresponding to a price discount. For example, if the price of content from the current service is an issue for the user, the media guidance application may determine to generate for display content that offers a discount in price (e.g., advertisements 510 (FIG. 5)).

At step 820, the media guidance application determines whether any criteria was selected. For example, the media guidance application may access a database (e.g., located locally at storage 308 (FIG. 3) or remotely at any location accessible via communications network 414 (FIG. 4)) of content associated with preventing a user from terminating the use of the service. The media guidance application may filter (e.g., via control circuitry 304 (FIG. 3)) the available content based on the criteria and retrieve (e.g., via control circuitry 304 (FIG. 3)) the content associated with the criteria at step 824.

Alternatively, if the media guidance application determines that no criteria was selected, the media guidance application may select default content associated with preventing the user from terminating the use of the service. In some embodiments, the default content may be randomly selected or may be selected based on additional factors. For example, while not based on any selected criteria, the content may still be targeted to a user based on information about the user found in a user profile (e.g., located at storage 308 (FIG. 3) and/or any location accessible via communications network 414 (FIG. 4)).

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for preventing users from terminating services, the method comprising:
    determining a user is subscribed to a first service;
    determining media assets accessible through the first service;
    transmitting a command to a display device capable of accessing the media assets through the first service to generate a user interface for receiving a selection of the media assets by a user;
    generating a viewing history for the user based on the media asset selections received from the display device over a period of time, wherein the viewing history includes a list of characteristics preferred by the user that are determined without user input and based on the media asset selections received;
    storing the viewing history in a user profile stored in a storage circuitry;
    retrieving, from the storage circuitry, the viewing history for the user from the user profile;
        identifying a preferred media asset of the media assets based on a consumption rate associated with the media asset determined from the viewing history;
        determining in real-time whether the preferred media asset is accessible through a second service;
        in response to determining the preferred media asset is accessible through the second service, calculating a score indicating a likelihood the user will terminate the first service by:
            retrieving, from the storage circuitry, a plurality of viewing histories of a plurality of users who previously terminated the first service;
            comparing, using control circuitry, the viewing history for the user with the plurality of viewing histories of the plurality of users who previously terminated the first service;
            based on the comparison, identifying a similar attribute between the viewing history for the user and the plurality of viewing histories of the plurality of users who previously terminated the first service;
            retrieving, from the storage circuitry, a correlation factor between the similar attribute and the first service;
            calculating, based on the correlation factor, the score indicating the likelihood the user will terminate the first service;
        comparing, using the control circuitry, the score indicating the likelihood the user will terminate the first service to a first threshold value; and
    in response to determining the score indicating the likelihood the user will terminate the first service exceeds the first threshold value, generating for display, on the display device, a first promotion to retain the user; and
    in response to determining the score indicating the likelihood the user will terminate the first service exceeds a second threshold value that is higher than the first threshold value, generating for display, on the display device, a second promotion to retain the user.

2. The method of claim 1, wherein determining whether the preferred media asset is accessible through the second service, further comprises cross-referencing a database listing a plurality of services to determine whether the second service provides the preferred media asset.

3. The method of claim 1, further comprising:
    comparing a first price for accessing the preferred media asset through the first service to a second price for accessing the preferred media asset through the second service; and
    determining not to generate for display, on the display device, the content associated with preventing the user from terminating the first service in response to determining that the first price is less than the second price.

4. The method of claim 1, further comprising:
comparing a first date when the preferred media asset is accessible through the first service to a second date when the preferred media asset is accessible through the second service; and
determining not to generate for display, on the display device, the content associated with preventing the user from terminating the first service in response to determining that the first date is before the second date.

5. The method of claim 1, further comprising determining whether the preferred media asset is accessible through the second service in response to determining that a subscription period for the first service is ending.

6. The method of claim 1, wherein the content includes a discount for the first service.

7. The method of claim 1, wherein the content includes a list of the media assets accessible through the first service.

8. The method of claim 7, wherein the media assets accessible through the first service are accessible at a future point in time.

9. The method of claim 1, wherein identifying a preferred media asset of the media assets based on the viewing history comprises:
determining, from the viewing history for the user, that the user has viewed a plurality of episodes of a series of media assets;
calculating a time period based on a first time stamp when the user started a first episode of the plurality of episodes and a second time stamp when the user finished a most recent episode of the plurality of episodes;
calculating a consumption rate of the series by dividing a number of the plurality of episodes by the time period;
comparing the consumption rate to an average rate that the user views media assets; and
in response to determining that the consumption rate is greater than the average rate, determining that the series of media assets is the preferred media asset.

10. The method of claim 1, wherein the content associated with preventing the user from terminating the service is displayed simultaneously with a media listings for the media assets accessible through the first service.

11. A system for preventing users from terminating services, the system comprising:
storage circuitry configured to store content associated with preventing the user from terminating the service; and
control circuitry configured to:
determine a user is subscribed to a first service;
determine media assets accessible through the first service;
transmit a command to a display device capable of accessing the media assets through the first service to generate a user interface for receiving a selection of the media assets by a user;
generate a viewing history for the user based on the media asset selections received from the display device over a period of time, wherein the viewing history includes a list of characteristics preferred by the user that are determined without user input and based on the media asset selections received;
store the viewing history in a user profile stored in a storage circuitry;
retrieve the viewing history for the user from the user profile;
identify a preferred media asset of the media assets based on a consumption rate associated with the media asset determined from the viewing history;
determine in real time whether the preferred media asset is accessible through a second service;
in response to determining the preferred media asset is accessible through the second service, calculate a score indicating a likelihood the user will terminate the first service by:
retrieving a plurality of viewing histories of a plurality of users who previously terminated the first service;
comparing the viewing history for the user with the plurality of viewing histories of the plurality of users who previously terminated the first service;
based on the comparison, identifying a similar attribute between the viewing history for the user and the plurality of viewing histories of the plurality of users who previously terminated the first service;
retrieving a correlation factor between the similar attribute and the first service;
calculating, based on the correlation factor, the score indicating the likelihood the user will terminate the first service;
compare the score indicating the likelihood the user will terminate the first service to a first threshold value; and
in response to determining the score indicating the likelihood the user will terminate the first service exceeds the first threshold value, generate for display, on the display device, a first promotion to retain the user; and
in response to determining the score indicating the likelihood the user will terminate the first service exceeds a second threshold value that is higher than the first threshold value, generating for display, on the display device, a second promotion to retain the user.

12. The system of claim 11, wherein the control circuitry is configured to determine whether the preferred media asset is accessible through the second service, is further configured to cross-reference a database listing a plurality of services that provide the preferred media asset to determine whether the second service provides the preferred media asset.

13. The system of claim 11, wherein the control circuitry is configured to:
compare a first price for accessing the preferred media asset through the first service to a second price for accessing the preferred media asset through the second service; and
determine not to generate for display, on the display device, the content associated with preventing the user from terminating the first service in response to determining that the first price is less than the second price.

14. The system of claim 11, wherein the control circuitry is configured to:
compare a first date when the preferred media asset is accessible through the first service to a second date when the preferred media asset is accessible through the second service; and
determine not to generate for display, on the display device, the content associated with preventing the user from terminating the first service in response to determining that the first date is before the second date.

15. The system of claim 11, wherein the control circuitry is configured to determine whether the preferred media asset is accessible through the second service in response to determining that a subscription period for the first service is ending.

16. The system of claim 11, wherein the content includes a discount for the first service.

17. The system of claim 11, wherein the content includes a list of the media assets accessible through the first service.

18. The system of claim 17, wherein the media assets accessible through the first service are accessible at a future point in time.

19. The system of claim 11, wherein the control circuitry, when identifying a preferred media asset of the media assets based on the viewing history, is configured to:

determine, from the viewing history for the user, that the user has viewed a plurality of episodes of a series of media assets;
calculate a time period based on a first time stamp when the user started a first episode of the plurality of episodes and a second time stamp when the user finished a most recent episode of the plurality of episodes;
calculate a consumption rate of the series by dividing a number of the plurality of episodes by the time period;
compare the consumption rate to an average rate that the user views media assets; and
in response to determining that the consumption rate is greater than the average rate, determine that the series of media assets is the preferred media asset.

20. The system of claim 11, wherein the content associated with preventing the user from terminating the service is displayed simultaneously with a media listings for the media assets accessible through the first service.

* * * * *